United States Patent
Miklós et al.

(10) Patent No.: US 9,173,153 B2
(45) Date of Patent: Oct. 27, 2015

(54) MOBILE LAYER 2 VIRTUAL PRIVATE NETWORK OVER INTERNET PROTOCOL NETWORKS

(75) Inventors: György Miklós, Pilisborosjenö (HU); Janos Harmatos, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 254 days.

(21) Appl. No.: 13/816,594

(22) PCT Filed: Aug. 13, 2010

(86) PCT No.: PCT/EP2010/004997
§ 371 (c)(1),
(2), (4) Date: Feb. 21, 2013

(87) PCT Pub. No.: WO2012/019629
PCT Pub. Date: Feb. 16, 2012

(65) Prior Publication Data
US 2013/0142093 A1    Jun. 6, 2013

(51) Int. Cl.
*H04W 40/00* (2009.01)
*H04W 8/06* (2009.01)
*H04W 76/02* (2009.01)
*H04W 80/02* (2009.01)
*H04W 80/04* (2009.01)

(52) U.S. Cl.
CPC ............ *H04W 40/00* (2013.01); *H04W 8/06* (2013.01); *H04W 76/022* (2013.01); *H04W 80/02* (2013.01); *H04W 80/04* (2013.01)

(58) Field of Classification Search
None
See application file for complete search history.

(56) References Cited

U.S. PATENT DOCUMENTS

| 2005/0136920 A1* | 6/2005 | Rink et al. ............. 455/433 |
| 2007/0140170 A1* | 6/2007 | Jagana et al. ........... 370/331 |
| 2008/0056251 A1  | 3/2008 | Zheng |
| 2009/0016277 A1* | 1/2009 | Kawakami .............. 370/329 |

(Continued)

OTHER PUBLICATIONS

Wu Q. et al.; "MIP Extension for Ethernet Service Transport Support; draft-wu-mip4-ether-02"; Internet Engineering Task Force, Network Working Group Internet-Draft; May 12, 2009; pp. 1-12; XP15062372A; IETF Trust.

*Primary Examiner* — Chi H Pham
*Assistant Examiner* — Shick Hom
(74) *Attorney, Agent, or Firm* — Coats & Bennett, P.L.L.C.

(57) ABSTRACT

The present disclosure relates to a technique for maintaining communication established between a mobile node (20) and a home network (100) of the mobile node (20). A method embodiment comprises the step of: determining whether the mobile node 20 has moved to a foreign network (120) different from the home network (100); wherein, when it is determined in the step of determining that the mobile node (20) has moved to the foreign network (120), the method embodiment further comprises the steps of: signalling, by the mobile node (20), a foreign address assigned by the foreign network (120), to a home agent (10) of the home network (100); and maintaining the communication between the mobile node (20) and the home network (100) by establishing communication between the mobile node (20) and the home agent (10) of the home network (10) for transmission of Data Link Layer ("DLL") frames through an Internet Protocol ("IP") based network (140), wherein the mobile node (20) is addressed by the home agent (10) by means of the foreign address assigned by the foreign network (120).

18 Claims, 11 Drawing Sheets

(56) References Cited

U.S. PATENT DOCUMENTS

| | | | |
|---|---|---|---|
| 2009/0213811 A1* | 8/2009 | Wang et al. | 370/331 |
| 2009/0225690 A1* | 9/2009 | Lach et al. | 370/312 |
| 2010/0067503 A1 | 3/2010 | Premec | |
| 2010/0085970 A1* | 4/2010 | Barkan et al. | 370/392 |
| 2011/0013614 A1* | 1/2011 | Chen | 370/338 |
| 2011/0211553 A1* | 9/2011 | Haddad | 370/331 |

* cited by examiner

MOBILE LAYER 2 VIRTUAL PRIVATE NETWORK OVER INTERNET PROTOCOL NETWORKS

TECHNICAL FIELD

The invention generally relates to the field of Layer 2 tunnelling over IP networks. More specifically, the invention relates to a technique for maintaining communication established between a mobile node and a home network of the mobile node by means of Layer 2 tunnelling over Internet Protocol (IP) networks.

BACKGROUND

Layer 2 (synonymously called Data Link Layer (DLL)) is the second layer of the seven-layer OSI model of computer networking. The DLL is the protocol layer which transfers data between adjacent network nodes in a Wide Area Network (WAN) or between nodes on the same Local Area Network (LAN) segment. WANs are used to connect LANs and other types of networks together, so that users and computers in one location can communicate with users and computers in other locations. A network segment is a portion of a computer network, wherein every device communicates using the same Physical Layer (the Physical Layer is the first and lowest layer in the seven-layer OSI-model of computer networking).

The DLL provides the functional and procedural means to transfer data between network entities and might provide the means to detect and possibly correct errors that may occur in the Physical Layer. Delivery of frames by Layer 2 devices is affected through the use of unambiguous hardware (physical) addresses. A frame's header contains source and destination addresses that indicate which device originated the frame and which device is expected to receive and process it. In computer networking the term physical address is often used as a synonym of Media Access Control (MAC) address. This address is used on a network's DLL for identifying the source and destination.

The DLL is concerned with local delivery of frames between devices on the same LAN. These DLL frames do not cross the boundaries of a local network, e.g. a LAN.

However, with increasing importance of mobile communications, scenarios become increasingly important in which a user of a mobile communication terminal leaves his home local network and moves to another foreign local network. For instance, a user could start from fixed Ethernet in the office and then disconnect his laptop or mobile phone and move to the office's Wireless LAN (WLAN). When the user leaves the office, the laptop or mobile phone could start using 2G or 3G mobile data networks (e.g., Enhanced Data Rates for GSM Evolution (EDGE), High Speed Packet Access (HSPA), Wideband Code Division Multiple Access (WCDMA), Universal Mobile Telecommunications System (UMTS), High Speed Downlink Packet Access (HSDPA) or the like). When the user arrives home, the laptop could switch to the home WLAN.

For this scenario, it is desirable that the user's mobile communication terminal maintains connectivity when moving from one local network to the other.

One approach has been to extend the local network. So far, Layer 2 Virtual Private Network (VPN) technologies are used extensively to extend a Layer 2 network beyond its physical boundaries. Multiple tunnelling or marking mechanisms are available to create a larger logical Layer 2 network over an existing Layer 2 or Layer 3 (also called Network Layer, which is the third layer of the seven-layer OSI-model of computer networking) infrastructure. Such mechanisms include Virtual Local Area Network (VLAN) mechanisms over Layer 2 networks (802.1ad), or tunnelling of Layer 2 frames over an Internet Protocol (IP) network using e.g., Layer 2 Tunnelling Protocol version 3 (L2TPv3), Secure Sockets Layer (SSL) or other protocols.

Layer 2 VPN solutions have an advantage over layer 3 VPN solutions in that they automatically support all Layer 3 protocols, implying that not only IP but also other Layer 3 protocols can run smoothly. Even though it is usually possible to rely on IP for most networking applications, configuring and managing a routed IP network may take longer and be more costly. Besides, using Layer 2 VPN solutions can make it easier to support broadcast/multicast as well. It must be noted though that the use of Layer 2 VPN also comes with an overhead because the tunnelled packets are longer due to the need to transfer Layer 2 frames (DLL frames). This overhead can be mitigated via the use of header compression.

Although there are several techniques of tunnelling Layer 2 frames over an IP network, e.g. L2TPv3 or other tunnelling methods, existing mechanisms do not provide an efficient way to support mobility for the end user when his IP address changes while maintaining Layer 2 VPN connectivity.

MOBIKE is a protocol defined at the IP layer to enable mobility for Internet Protocol security (IPsec) tunnelling which can also be used to carry Layer 2 frames (in combination with L2TPv3). MOBIKE can support mobility (including change of interface) for an end host while maintaining VPN connectivity. MOBIKE achieves this by automatically re-negotiating the security association for the IPsec tunnel to use another pair of endpoints. This can be used by an end host as it moves while being away from the home network that it connects. There is, however, a limitation of MOBIKE. That is, when the user physically connects to its home network, the IPsec tunnelling is still maintained. This means that all traffic must pass through the VPN server even when it would not be otherwise necessary since the user stays at his home network.

Tunnelling all local traffic through an IPsec tunnel via the local VPN server might be useable in certain deployments, but in general such an approach gives inferior performance and incurs additional costs due to the high load that this would cause on the VPN server. In a residential or corporate scenario, many users are stationary most of the time (connected to his/her home/corporate network), and only rarely move away (to another network). Hence, it is hard to justify tunnelling all of the traffic through the VPN server (independent of whether the user connects its mobile device to the home/corporate network or to another/foreign network) just because some users may sometimes move.

SUMMARY

Accordingly, there is a need to provide an improved, more user-friendly and more efficient Layer 2 tunnelling technique with mobility support.

According to a first aspect, a method for maintaining communication established between a mobile node and a home network of the mobile node is provided. The method comprises the step of determining whether the mobile node has moved to a foreign network different from the home network; wherein, when it is determined in the step of determining that the mobile node has moved to the foreign network, the method further comprises the steps of: signalling, by the mobile node, a foreign address assigned by the foreign network to a home agent of the home network; and maintaining the communication between the mobile node and the home network by establishing communication between the mobile node and the home agent of the home network for transmission of Data Link Layer (DLL) frames through an Internet Protocol (IP) based network, wherein the mobile node is addressed by the home agent by means of the foreign address assigned by the foreign network.

The mobile node may be any mobile communication device like a mobile telephone, a Personal Digital Assistant (PDA), a network card, a laptop or any other mobile communication apparatus which is capable of communicating wirelessly (via an air interface) or wirelined with a network, e.g. the home network or the foreign network.

The home network may be any network to which the mobile node usually connects, e.g. a residential or corporate Local Area Network (LAN). Likewise, the foreign network may be any network to which the mobile node at least once connects, e.g. an open Wireless Local Area Network (WLAN) like a Hotspot. However, the home network and the foreign network are not restricted by these exemplarily given networks. The home network and foreign network may be any wired and wireless network e.g. any network for getting access to the Internet. In this way, the home network and the foreign network may be part of any wired or wireless environments where users need to carry their mobile nodes (mobile devices) across one or more multiple LAN subnets. Thus, the method aspects described herein may be used in roaming between overlapping wireless systems, for example WLAN, Worldwide Interoperability for Microwave Access (WiMAX) and Wireless Broadband. The home network and the foreign network may also be any kind of cellular or mobile network, e.g. Global System for Mobile Communications (GSM) network, General Packet Radio Service (GPRS) network, Code Division Multiple Access (CDMA) network, Enhanced Data Rates for GSM Evolution (EDGE) network, 3G network (e.g., High Speed Packet Access (HSPA) network, Wideband Code Division Multiple Access (WCDMA) network or the like), 3GPP Long Term Evolution (LTE) network or LTE Advanced network.

The mobile node may receive its identifying home address, e.g. identifying IP address, from the home network. In other words, the home address of the mobile node may be the identifying home address (e.g., IP address) assigned to the mobile node within its home network. Alternatively, the home address may also be the physical address of the mobile node, e.g. the Media Access Control (MAC) address of the mobile node. The foreign address of the mobile node is the identifying foreign address (e.g., IP address) assigned to the mobile node within the foreign network. For example, the foreign address is a Care-of-Address (CoA) of the mobile node, like the IP address of the mobile node when operating in the foreign network (e.g., the foreign address may be an IP CoA).

Within the context of the method according to the first aspect, the foreign network is the network in which the mobile node is operating when away from its home network. In this way, there may be one or more foreign networks to which the mobile node may consecutively move when it is away from its home network.

In the step of determining it may be determined whether the mobile node has moved from the home network to the foreign network. Alternatively, it may be determined in the step of determining whether the mobile node has moved from the foreign network (first foreign network) to a further foreign network (second foreign network) different from the first foreign network. In the step of determining it may also be determined whether the mobile node has returned to its home network. The step of determining may be repeatedly performed such that it may be determined, in a first step of determining, that the mobile node has moved from the home network to the foreign network (first foreign network) and such that it may be determined, in a second step of determining (performed after the first step of determining), that the mobile node has moved from the foreign network to the further foreign network.

Further nodes or mobile nodes requiring to establish communication with the mobile node preferably address the mobile node by using a home address of the mobile node. In other words, a further mobile node may direct data (intended for the mobile node) to the mobile node by means of the home address. In case it has been determined in the step of determining that the mobile node is connected to the home network (i.e., the mobile node has not moved to the foreign network, but is connected to the home network), data (transmitted from the further mobile node) addressed to the home address of the mobile node may be directly forwarded or transmitted from the home network to the mobile node by using known forwarding and transmission techniques. In this case, the mobile node and the home network may directly communicate with each other.

If it is, however, determined in the step of determining that the mobile node is not connected to the home network, but has moved to a foreign network, a different technique is preferably applied.

In this case two scenarios are conceivable. At first, it is conceivable that data is addressed to the mobile node (i.e., the mobile node is in receiving mode). Secondly, it is conceivable that the mobile node itself transmits data intended for the further node or further mobile node (i.e., the mobile node is in transmission mode).

When the mobile node is in receiving mode, the method according to the first aspect may further comprises the step of receiving, by the home agent of the home network, data addressed to the home address of the mobile node. When it is determined in the step of determining that the mobile node has moved to the foreign network, the method according to the first aspect may further comprise the step of forwarding, by the home agent of the home network, DLL frames to the foreign address of the mobile node through the IP based network, wherein the DLL frames contain the data addressed to the home address of the mobile node.

When the mobile node is in transmission mode, the method according to the first aspect may further comprise, when it is determined in the step of determining that the mobile node has moved to the foreign network, the step of receiving, by the home agent of the home network, DLL frames transmitted from the mobile node through the IP based network, wherein the mobile node has the foreign address assigned by the foreign network, and the step of forwarding, by the home agent of the home network, the DLL frames received by the home agent from the mobile node.

Independent of whether the mobile node is in receiving mode (i.e., the mobile node is addressed to receive data) or in transmission mode (i.e., the mobile node transmits data) the step of forwarding may be performed by tunnelling the DLL frames by using Layer 2 Tunneling Protocol (L2TP), Layer 2 Tunneling Protocol version 3 (L2TPv3), EtherIP, IP security (IPsec) or Security Socket Layer (SSL) through the IP-based network.

There are multiple realizations to determine whether the mobile node is connected to the home network (or has moved to the foreign network). According to a first realization, it is determined in the step of determining that the mobile node is connected to the home network, if a preconfigured identification broadcast of the home network is detected by the mobile node and if, in response to receipt of the preconfigured identification broadcast, successful authentication towards the home network is performed by the mobile node.

According to a second realization, the step of determining whether the mobile node has moved to the foreign network comprises the steps of sending, by the mobile node, a solicitation message as a local broadcast frame to the home network and sending, by the home agent in response to receipt of the solicitation message, an advertisement message as a local broadcast frame to the mobile node, wherein it is determined that the mobile node is connected to the home network, if the advertisement message arrives at the mobile node within a predefined time period. In response to receipt of the advertisement message, the mobile node may send a broadcast message as a local broadcast frame sent only on the home network, wherein the broadcast message contains the home address of the mobile node in the home network.

There are multiple implementations of how the home agent can become aware of the foreign address of the mobile node assigned by the foreign network the mobile node is connected to.

According to a first implementation, the foreign address assigned by the foreign network may be signalled to the home agent by the mobile node. The step of signalling may comprise the step of sending, by the mobile node, a binding update to the home agent, which binds the signalled foreign address with a physical address of the mobile node.

Alternatively, in accordance with a second implementation, the home agent may learn the physical address of the mobile node. For example, the physical address may be a Media Access Control (MAC) address of the mobile node and the home agent may use MAC learning to learn the MAC address of the mobile node.

According to one variant of the method according to the first aspect, one or more devices may be connected to the mobile node. The one or more devices may be any kind of mobile or stationary devices that are connectable with a mobile device, e.g. printers, laptops, mobile phones like mobile phones connectable to laptop computers or vice versa and so on.

In accordance with this variant, independent of whether the foreign address of the mobile node has been signalled by the mobile node to the home agent (first implementation) or whether the home agent has learned the physical address of the mobile node (second implementation), a further foreign address of the device, which is connected to the mobile node, may be signalled by the mobile node to the home agent. The further foreign address may also be assigned by the foreign network to which the mobile node and the device connected to the mobile node are connected.

In case one or more devices are connected to the mobile node, the mobile node may forward DLL frames to the further foreign address of the device. In this way, the mobile node may act as a bridge from the home network to the one or more devices connected to the mobile node.

According to a second aspect, a computer program product is proposed, comprising program code portions for performing steps of any one of the method aspects described herein, when the computer program product is run on one or more computing devices. The computer program product may be stored on a computer readable recording medium.

According to a third aspect, a home agent for maintaining communication established between a mobile node and a home network of the mobile node is proposed. The home agent comprises a receiving component for receiving, from the mobile node, a foreign address assigned by a foreign network different from the home network of the mobile node, when the mobile node has moved to the foreign network; and a tunnelling component for maintaining the communication between the mobile node and the home network by establishing communication between the mobile node and the home agent for transmission of Data Link Layer (DLL) frames through an Internet Protocol (IP) based network, wherein the tunnelling component is adapted to address the mobile node by means of the foreign address assigned by the foreign network.

According to a fourth aspect, a network system for maintaining communication established between a mobile node and a home network of the mobile node is proposed. The network system comprises the home agent according to the third aspect and the mobile node. The network system is adapted to determine whether the mobile node has moved to the foreign network, and, when it is determined that the mobile node has moved to the foreign network, the network system is adapted to maintain the communication between the mobile node and the home network by establishing communication between the mobile node and the home agent of the home network for transmission of Data Link Layer ("DLL") frames through an Internet Protocol ("IP") based network, wherein the mobile node is addressed by the foreign address assigned by the foreign network.

In the network system, the home agent may be adapted to receive data addressed to a home address of the mobile node and, when it is determined that the mobile node has moved to the foreign network, to forward DLL frames to the foreign address of the mobile node through the IP based network, wherein the DLL frames contain the data addressed to the home address of the mobile node.

Alternatively or additionally, when it is determined that the mobile node is connected to the foreign network, the home agent may be adapted to receive DLL frames transmitted from the mobile node through the IP based network, wherein the mobile node has the foreign address assigned by the foreign network, and to forward the DLL frames received by the home agent from the mobile node.

BRIEF DESCRIPTION OF THE DRAWINGS

In the following, the invention will further be described with reference to exemplary embodiments illustrated in the figures, in which:

FIG. 4b is a flow diagram schematically illustrating further steps of the second method embodiment of FIG. 4a;

FIG. 6b is a flow diagram schematically illustrating further steps of the third method embodiment of FIG. 6a.

DETAILED DESCRIPTION

In the below, for purposes of explanation and not limitation, specific details are set forth in order to provide a thorough understanding of the present invention. It will be apparent to one skilled in the art that the present invention may be practiced in other embodiments that depart from these specific details. For example, although the exemplary embodiments are described in connection with the 802.1D standard terminology to illustrate the present invention, they are equally applicable to other kinds of bridging techniques. Also, the invention may be practiced in any network to which mobile users may attach. For example, the present invention is applicable to, besides cellular networks, Local Area Networks (LANs), Wireless LANs (WLANs), or similar wireless networks, but also to wireline networks such as, for example, the intranet of a company with some or many separated subsidiaries or the Internet. Further, the term mobile node used hereinbelow may be any kind of mobile communication device like a mobile telephone, a Personal Digital Assistant (PDA), a network card, a laptop or any other mobile communication apparatus which is capable of communicating wirelessly (via an air interface) or wirelined with a network.

Those skilled in the art will further appreciate that the functions explained herein below may be implemented using hardware circuitry, software means, or a combination thereof. The software means may be in conjunction with a programmed microprocessor or a general purpose computer, using an Application Specific Integrated Circuit (ASIC) and/or Digital Signal Processors (DSPs). It will also be apparent that when the present invention is described as a method, it may also be embodied in a computer processor and a memory coupled to the processor, wherein the memory is encoded with one or more programs that perform the method when executed by the processor.

Further, the following concepts and embodiments may be applied to the base mobile IP protocol to enable a mobile Layer 2 (L2) (Data Link Layer (DLL)) Virtual Private Network (VPN) solution. For example, the following concepts and embodiments may be applied to DSMIPv6 as described in Request For Comments (RFC) 5555. However, the concepts and embodiments can be applied to any other mobile IP protocol variant such as basic MIPv6 as described in RFC3375.

Figure 1:
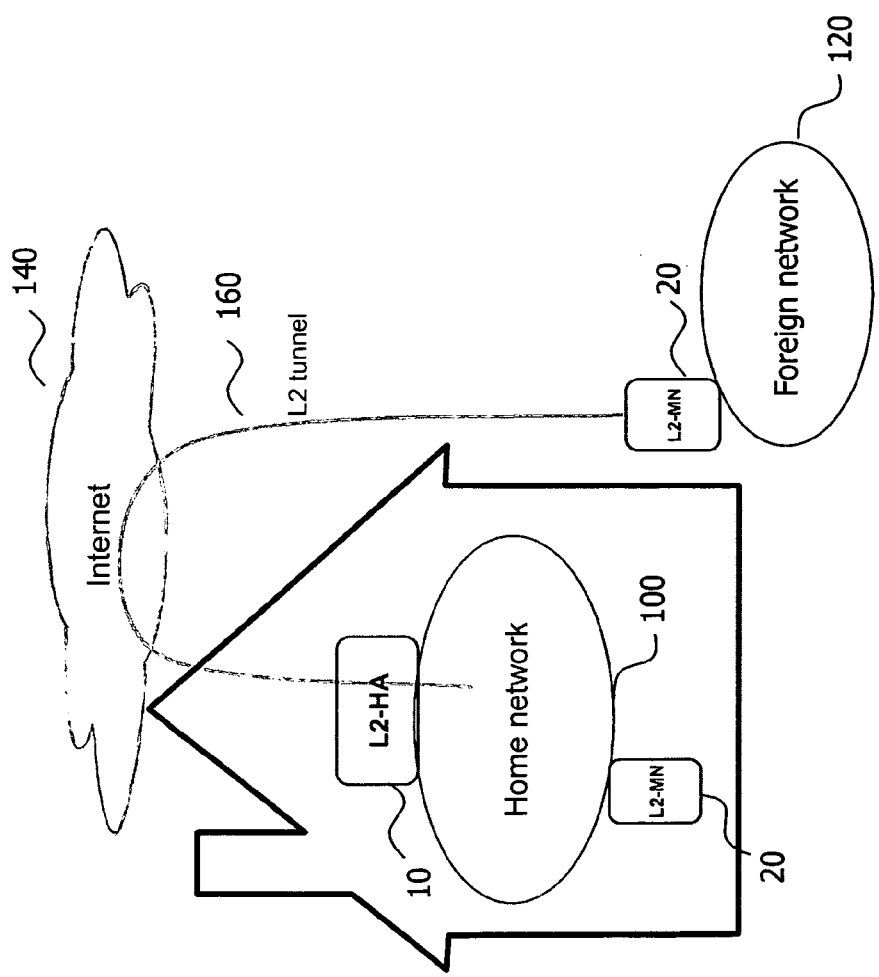
FIG. 1 is a schematic illustration of a first network system embodiment comprising a home agent which is connected to a home network and a mobile node which is connectable to the home network and to a foreign network.

With reference to FIG. 1, a first network system embodiment is schematically illustrated. The network system embodiment comprises a Layer 2 (L2) Mobile Node (MN) 20 (L2-MN 20) and a Layer 2 (L2) Home Agent (HA) 10 (L2-HA 10) which are both connectable to a home network 100.

The home network 100 is exemplarily configured in FIG. 1 as an L2 home network to which L2 devices having 1.2 connectivity can be connected. FIG. 1 further exemplarily illustrates a scenario in which both the L2-MN 20 and the L2-HA 10 are connected to the home network. The L2-HA 10 is connected in a stationary manner to the L2 home network 100, i.e. does not move away from the L2 home network 100 to connect with other networks. The L2-MN 20, however, is moveably connected to the L2 home network 100, i.e. the L2-MN 20 can move away from the L2 home network 100 and may connect to one or more foreign L2 networks. In FIG. 1, for sake of simplification, only one foreign network 120 (which is also exemplarily illustrated as an L2 network) is shown. However, the invention is not restricted to one single foreign network 120 to which the L2-MN 20 may connect, but may be implemented with a plurality of foreign (overlapping or non-overlapping) networks to which the L2-MN 20 can connect consecutively.

When the L2-MN 20 is connected to the L2 home network 100, the L2-MN 20 and the L2 home network 100 directly communicate with each other as known in the art.

When a user of the L2-MN 20 leaves the area of the L2 home network 100, direct communication between the L2 home network 100 and the L2-MN 20 becomes impossible. The user may then connect to the foreign network 120 for establishing data transmission and data reception to and from the Internet. As set forth in more detail with respect to FIG. 2a, the L2-HA 10 then forwards L2 frames to the foreign network 120 and thus to the L2-MN 20 through an L2 tunnel 160. The L2 tunnel 160 exemplarily comprises the Internet 140 in the embodiment shown in FIG. 1. However, the invention is not restricted hereto and the L2 tunnel 160 may additionally or alternatively comprise any kind of LAN segment suitable for tunnelling L2 frames.

FIG. 1 illustrates both cases, namely the case in which the L2-MN 20 is connected to the L2 home network 100 and the case in which the L2-MN 20 is connected to the foreign network 120. The L2 home network 100 is in FIG. 1 exemplarily illustrated as the user's residential network. However, the invention is not restricted thereto and the L2 home network 100 may be any kind of network the user normally connects with, e.g. his corporate network.

The functionality of the components of the network system embodiment of FIG. 1 will be described in more detail below with respect to the flow diagram illustrated in FIG. 2a.

At first, it is determined in step 202 to which network the L2-MN 20 is connected or attached, i.e. whether the L2-MN 20 is connected to the L2 home network 100 or has moved to the foreign network 120 different from the L2 home network 100 of the L2-MN 20. In the exemplary scenario, it is determined whether the L2-MN 20 has moved from the L2 home network 100 to the foreign network 120. However, it may alternatively be determined whether the L2-MN 20 has moved from the foreign network 120 to a further foreign network which is not illustrated in FIG. 1 and so on.

In step 204 the foregoing determination is evaluated. When it is determined in step 204 that the L2-MN is connected to the L2 home network 100, direct connection between the L2 home network 100 and the L2-MN 20 is established in step 206. In this way, the L2-MN 20 can transmit and receive data via the L2 home network 100 in a manner known in the art.

If it is, however, determined in step 204 that the L2-MN 20 has moved to the foreign network 120 (i.e., is now connected to the foreign network 120), mobile IP signalling is used between the L2-MN 20 and the L2-HA 10 in step 208 in order to update the L2-HA 10 with the current Care-of-Address (CoA) of the L2-MN 20 in the foreign network 120. The CoA is assigned by the foreign network 120, e.g. by a foreign agent (FA) (not illustrated) of the foreign network 120. For instance, a special flag in the mobile IP signalling indicates that the L2-HA 10 and the L2-MN 20 act in L2 mode. However, other signalling techniques are also conceivable.

In case data is now addressed to the home address of the L2-MN 20 (although the L2-MN 20 is not anymore connected to the L2 home network 100), the L2-HA 10 acts as a bridge and forwards L2 frames (containing the data) to the L2-MN 20 in step 210. For forwarding the L2 frames, the L2 tunnel 160 is established through the Internet 140 to the L2-MN 20. As the L2-HA 10 knows the CoA of the L2-MN 20 (the new destination address of the L2-MN 20), the L2-HA 10 can forward the data addressed to the home address of the L2-MN 20 on the L2 tunnel 160 towards the L2-MN 20 by using the CoA.

In case the L2-MN 20 is in transmission mode, i.e. is transmitting data, the L2-HA 10 also acts as a bridge and forwards L2 frames containing the data sent by the L2-MN 20 on its appropriate port.

In both cases (when the L2-MN 20 is receiving data or transmitting data) the L2 tunnel 160 between the L2-HA 10 and the L2-MN 20 may be regarded as a virtual LAN segment.

Figure 2A:
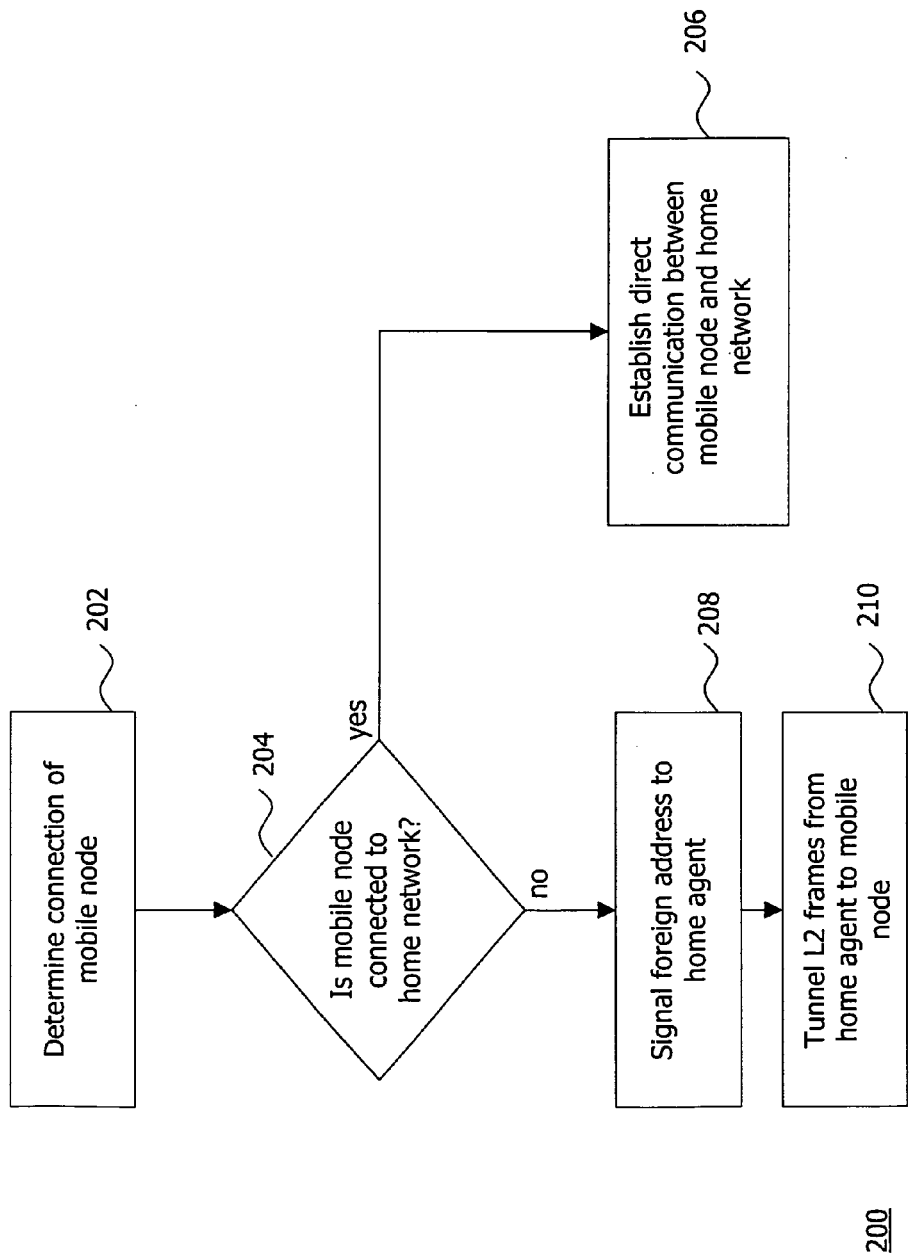
FIG. 2a is a flow diagram schematically illustrating a first method embodiment for establishing communication when the mobile node is connected to the home network and when the mobile node is connected to the foreign network.

There are multiple techniques for the L2-MN 20 to determine in step 202 of FIG. 2a whether it has returned to its L2 home network 100. Two of these techniques are in the following described with respect to FIGS. 2b and 2c.

Figure 2B:
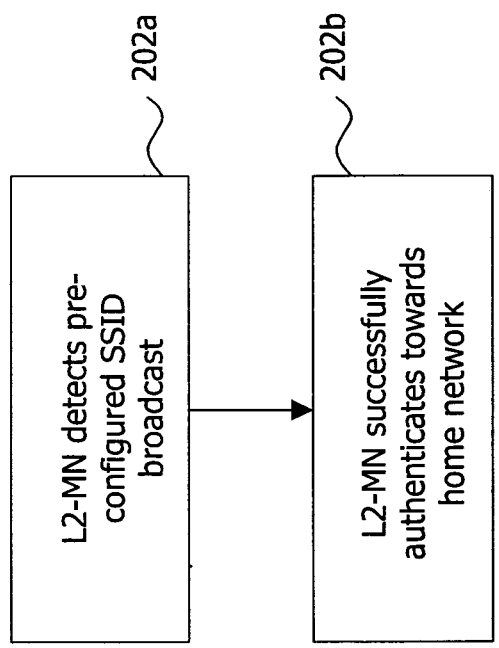
FIG. 2b is a flow diagram schematically illustrating a method for determining whether the mobile node is connected to the home network or to the foreign network of FIG. 1.

The detection whether the L2-MN 20 has returned home is illustrated in FIG. 2b for the case in which the L2 home network 100 is a WLAN access. The L2-MN 20 in this case tries to detect (in step 202a) a pre-configured Service Set Identifier (SSID) broadcast. When the L2-MN 20 detects the pre-configured SSID broadcast, it tries to successfully authenticate itself towards the WLAN Access Point (AP) in step 202b. If the L2-MN 20 can successfully authenticate itself towards the WLAN AP, it is determined in step 202b of FIG. 2b that the L2-MN 20 has returned to its L2 home network 100. Similar techniques are possible for other wireless accesses.

In other cases (such as wired home networks 100) the L2-MN 20 can determine that it has returned home based on performing the steps illustrated in FIG. 2c which are in more detail described below with respect to FIG. 2d.

In step 202A, the L2-MN 20 sends a L2-HA SOLICITATION message to the L2-HA 10. In step 202B, the L2-MN 20 waits for an L2-HA ADVERTISEMENT sent from the L2-HA 10 in response to reception of the L2-HA SOLICITATION message. For this purpose, the L2-HA ADVERTISEMENT message may contain a unique identification, such as the L2-HA's public IP address, to let the L2-MN 20 uniquely identify when it has returned home. In step 202C it is determined whether the L2-HA ADVERTISEMENT message arrives in a predefined timeout period, e.g. a timeout period between 5 and 20 seconds like 10 seconds. If the L2-HA ADVERTISEMENT message does not arrive in a predefined timeout period, the L2-MN 20 can conclude that it is away from its home network 100. Alternatively, before concluding (after the lapse of the timeout period) that the L2-MN 20 is away from its home network, retransmission of the L2-HA SOLICITATION message may be performed by the L2-MN 20 for a predetermined number of times. The L2-MN 20 may then again wait for the L2-HA ADVERTISEMENT message to determine whether the L2-HA ADVERTISEMENT message arrives in the predefined timeout period.

Figure 2C:
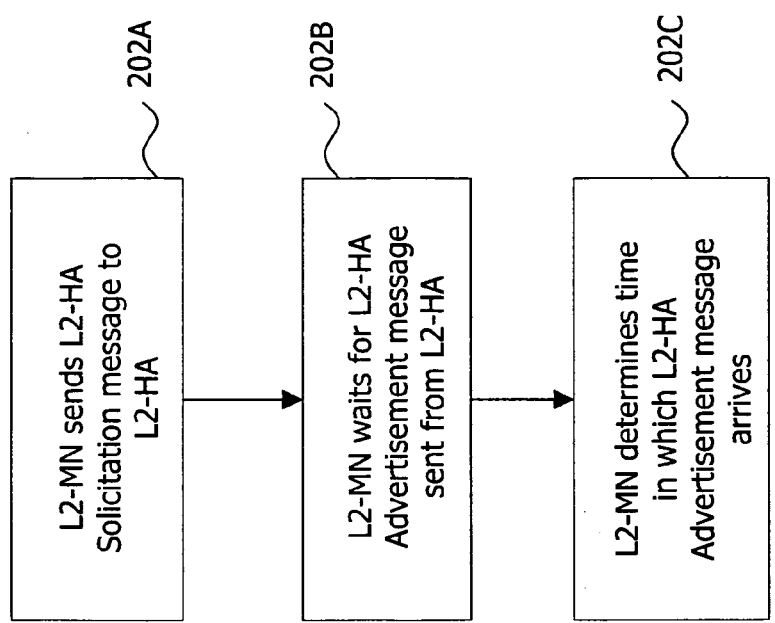
FIG. 2c is a flow diagram schematically illustrating another method for determining whether the mobile node is connected to the home network or to the foreign network of FIG. 1.

In the other direction, when the L2-MN 20 is moving away from home, steps 202A and 202B of FIG. 2c may be skipped, because in that case the delay towards the L2 home network 100 increases. Thus, there is no risk that an old L2 frame may co-exist in the network with another frame that is sent on the L2 tunnel 160 (L2 Mobile IP (MIP) tunnel 160). Nevertheless, steps 202A and 202B may be performed if needed when the L2-MN needs to decide whether it is connected to its home network 100. Step 226 of FIG. 2d (sending a broadcast frame) may be performed after the Binding Update to make it faster for other bridges to learn the L2-MN's 20 current location.

Figure 2D:
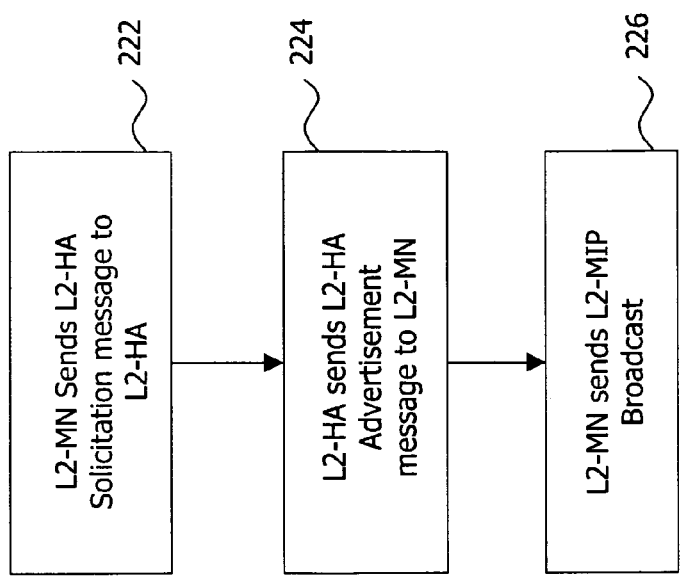
FIG. 2d is a flow diagram schematically illustrating an authentication method performed when the mobile node is connected to the home network of FIG. 1.

When the L2-MN 20 returns to its home network 100 after being away and having an active binding with the foreign network 120 which has been released, a special three-way broadcast handshake is performed as described with respect to FIG. 2d. In step 222, the L2-MN 20 sends an L2-HA SOLICITATION message as a local broadcast frame. The local broadcast frame may be a specially formatted frame which is sent only on the L2 home network 100 and is not sent on the L2 tunnel (L2 Mobile IP (MIP) tunnel) 160. Step 222 is used to let the L2-HA 10 become aware that the L2-MN 20 has returned to the L2 home network 100.

In step 224, the L2-HA 10 answers with an L2-HA ADVERTISEMENT message which is also a local broadcast frame. The local broadcast frame may also be a specially formatted frame which is sent only on the L2 home network 100 and which is not sent on the L2 MIP tunnel 160. From this point onwards, the L2-HA 10 may stop forwarding uplink L2 frames that may be coming via the L2 tunnel 160 and may instead silently discard those L2 frames. In the latter scenario, the L2-HA 10 may learn the new location (i.e., port) of the L2-MN 20, e.g. the MAC address of the L2-MN, based on which port this L2 frame (or these L2 frames) is coming from.

Step 224 is the response to step 222. The L2-HA ADVERTISEMENT message is preferably sent as a broadcast frame because there might have been some uplink L2 frames still coming via the L2 tunnel 160 which may have a larger latency and which may cause some intermediate bridges to think that the L2-MN 20 is reachable via the L2-HA 10. In this case, the L2-HA ADVERTISEMENT message might not reach the L2-MN 20 as a unicast frame. However, the L2-HA ADVERTISEMENT message may also be sent as a unicast frame, rather than as a broadcast frame.

In step 226, the L2-MN 20 sends an L2-MIP BROADCAST message as a local broadcast frame. This local broadcast frame may be any type of broadcast frame.

Step 226 ensures that all bridges forward packets towards the new location of the L2-MN 20 on the L2 home network 100.

When returning home, MIP signalling to release the L2-MIP 160 tunnel might be used, but it may be also skipped. Both ways of operation are possible by using solution 1 and solution 2 as set forth below.

If the MIP signalling is skipped when the L2-MN 20 returns home and connects to its L2 home network 100, the L2-HA 10 may automatically release the L2 tunnel 160 during step 224 (solution 1). This is possible when the L2 home network 100 can be trusted and there is no risk that other nodes would try to hijack or prevent the communication of the L2-MN 20. In this case, the L2-MN 20 can start sending L2 frames after performing step 226 (L2-MIP BROADCAST). The security of solution 1 may be further improved by adding cryptographic content to the message sent in step 222. In this case, the L2-MN 20 may add a token which is derived from the security association between the L2-MN 20 and the L2-HA 10 (e.g., the Binding Update (BU) message or part of it can be added). In this way, the L2-HA 10 can check the validity of the L2-HA SOLICITATION message sent in step 222. Cryptographic content may alternatively or additionally be added to the L2-HA ADVERTISEMENT message sent in step 224 to further increase security. By adding sufficient security protection to these messages (in steps 222 and/or 224), the subsequent BU signalling could be avoided without decreasing the security of solution 1.

MIP signalling may also be kept so that the L2-MN 20 sends a BU after performing step 226 (solution 2). The L2-HA 10 may then respond with a Binding Acknowledgement (ACK). In this case, the L2-HA 10 may start buffering downlink packets at step 224 and may send the buffered packets to the L2-MN 20 after the Binding ACK. The L2-MN 20 may start sending L2 frames after receiving the Binding ACK. This approach (solution 2) has a very high security even in case no security additions (e.g., adding cryptographic content) are added to the messages sent in steps 222 and/or 224. However, cryptographic content may also be added in solution 2 to further increase security.

Figure 3:
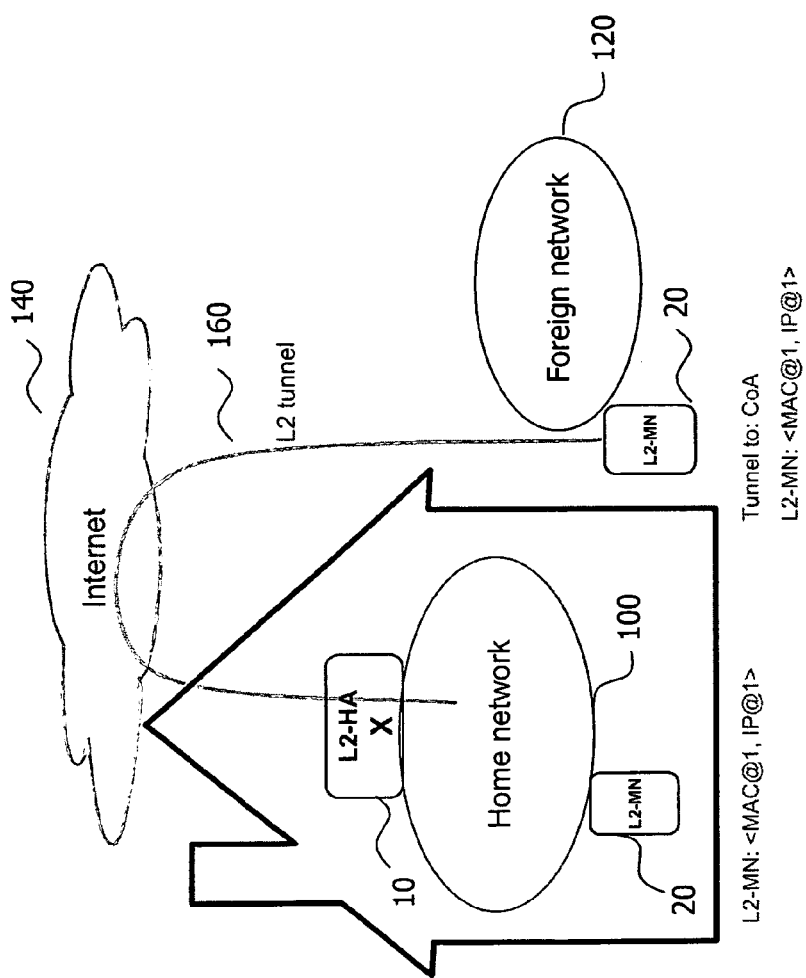
FIG. 3 is a schematic illustration of a second network system embodiment comprising a home agent which is connected to a home network and a mobile node which is connectable to the home network and to a foreign network.
Figure 5:
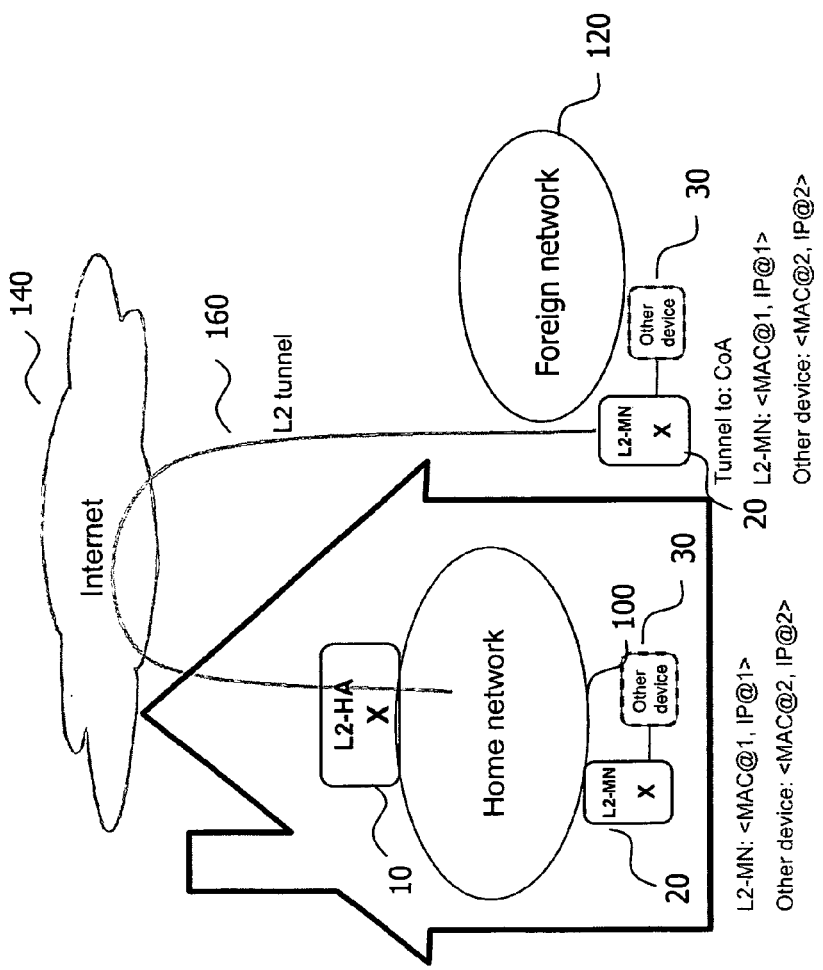
FIG. 5 is a schematic illustration of a third network system embodiment comprising a home agent which is connected to a home network and a mobile node having a device connected thereto, which are connectable to the home network and to a foreign network.

FIGS. 3 and 5 illustrate alternative configurations of network system embodiments regarding the addressing and the behaviour of the L2-MN 20 and the L2-HA 10. In FIGS. 3 and 5, components corresponding to those of FIG. 1 are provided with the same reference signs.

In the alternative network system as schematically illustrated in FIG. 3, the L2-MN 20 is at the edge of the L2 home network 100, meaning that it does not bridge between multiple L2 interfaces. The L2-MN 20 connects to the L2-HA 10 on an edge port in 802.1D terminology.

Figure 4A:
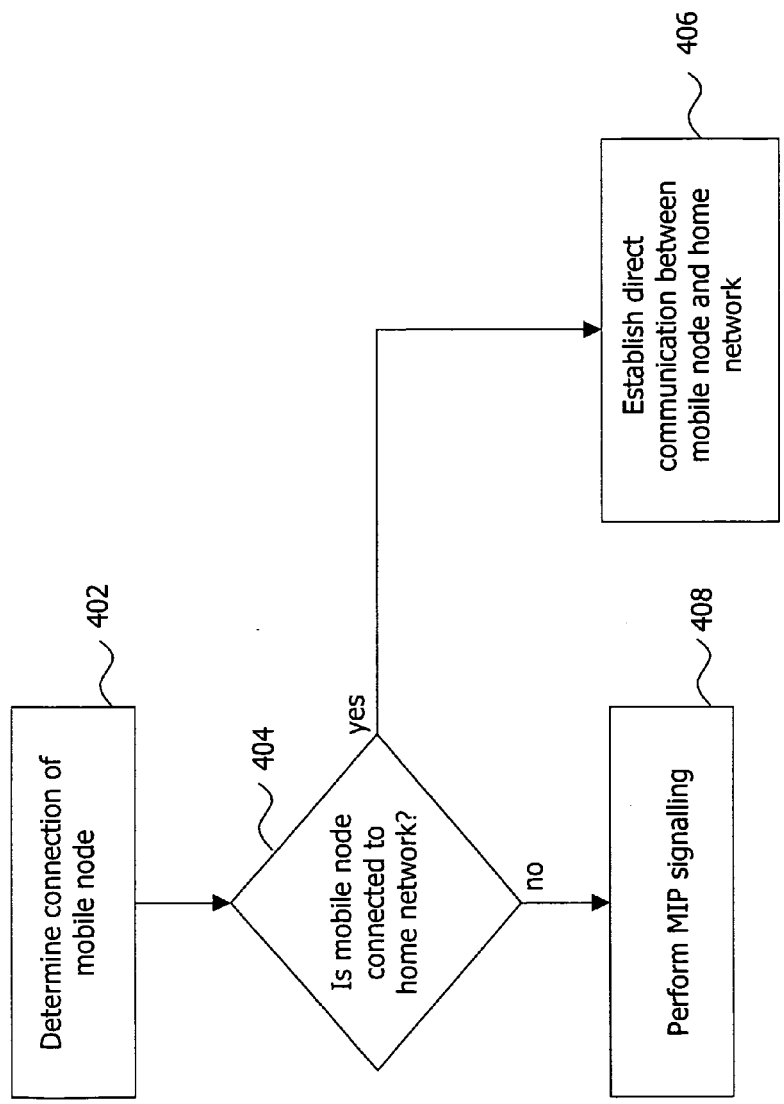
FIG. 4a is a flow diagram schematically illustrating a second method embodiment for establishing communication when the mobile node is connected to the home network and when the mobile node is connected to the foreign network.
Figure 4B:
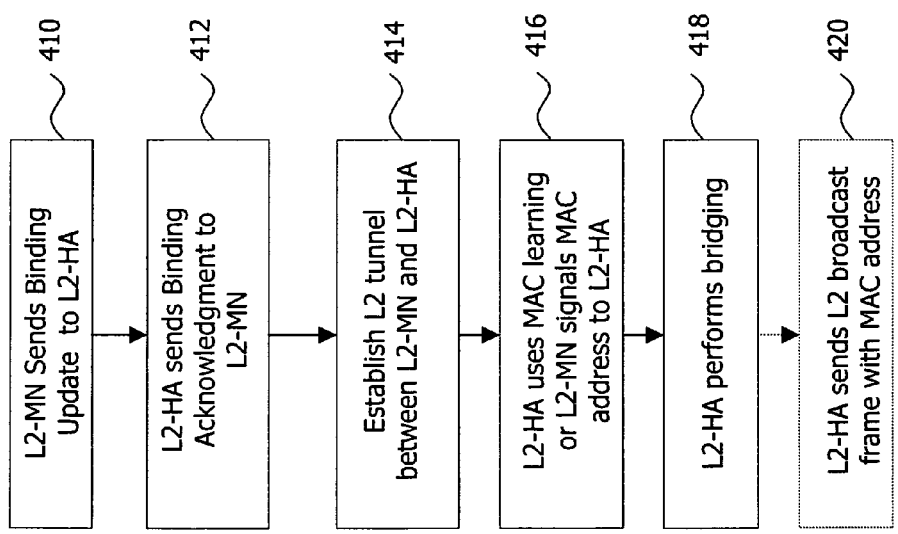

The functionality of the alternative network system as schematically illustrated in FIG. 3 is described with respect to FIGS. 4a and 4b.

At first, it is determined in step 402 of FIG. 4a, whether the L2-MN 20 is connected to the L2 home network 100 or to the foreign network 120. This determination is evaluated in step 404.

When it is determined in step 404 that the L2-MN 20 is attached to the home network 100, L2-MIP mechanisms are not activated and the L2-MN 20 uses one of its interfaces to connect to the home network 100. The foregoing is performed in step 406. In the exemplary scenario illustrated in FIG. 3, the L2-MN 20 has MAC@1 as its L2 address and IP@1 as its IP address.

When the L2-MN 20 moves away from the home network 100, i.e. it detects that it is no longer physically attached to the home network 100, a new IP address (CoA) is assigned to the L2-MN by the new (foreign) network 120 to which the L2-MN 20 attaches. For this scenario, mobile IP signalling is used in step 408 which is described in more detail with respect to the flow diagram shown in FIG. 4b.

At first, the L2-MN 20 sends a Binding Update (BU) to the L2-HA 10 in step 410 which binds its current CoA with the MAC address (MAC@1) of the L2-MN 20. The L2-HA 10 responds with a Binding Acknowledgement (ACK) in step 412.

As a result of the BU signalling (sending of BU and Binding ACK in steps 410 and 412), an L2 tunnel 160 is established between the L2-MN 20 and the L2-HA 10 in step 414. The L2 tunnel 160 is adapted to carry full L2 frames between the L2-MN 20 and the L2-HA 10 in both communication directions between the L2-MN 20 and the L2-HA 10. For establishing the tunnel 160 between the L2-HA 10 and the L2-MN 20, multiple techniques may be used, such as IP-in-IP or IPsec tunnelling. The use of IPsec may be advantageous for security reasons. On top of these tunnelling mechanisms, L2TPv3 or EtherIP can be used to carry L2 frames in the underlying IP tunnel 160.

Optionally, the L2-HA 10 may use MAC learning to learn the MAC address of the L2-MN 20, e.g. to discover that the L2-MN 20 having MAC address MAC@1 is reachable over the L2-MIP tunnel 160. Alternatively, the BU signalling can be used to notify the L2-HA 10 that the L2-MN 20 having MAC address MAC@1 is now reachable over the new L2 tunnel 160. One of the foregoing techniques (either MAC learning or BU signalling) is performed in step 416.

For transmitting data to the L2-MN 20, the L2-HA 10 acts as a 802.1D bridge in step 418 and forwards L2 frames with destination address MAC@1 and/or broadcasts L2 frames towards the L2-MN 20. In the other direction, the L2-HA 10 also forwards L2 frames sent by the L2-MN 20 on the appropriate LAN segment as defined by its 802.1D bridge role.

As defined in 802.1D RSTP (Rapid Spanning Tree Protocol) there is no need to update the Spanning Tree on the home network 100 as a result of the L2-MN 20 moving away, since the L2-MN 20 is connected via an edge port and the mobility of an edge port can not affect the Spanning Tree.

The L2-MN 20 may optionally send an L2 broadcast frame with MAC@1 as the source in step 420 in order to let other bridges in the subnet learn its new location. Broadcast could be e.g. a new Dynamic Host Configuration Protocol (DHCP) request, an Address Resolution Protocol (ARP) packet, a newly defined broadcast frame or other frames. Sending this broadcast frame may fasten the MAC learning in other bridges and may hence decrease packet losses and the amount of L2 broadcasts. However, step 420 may also be skipped.

Figure 6A:
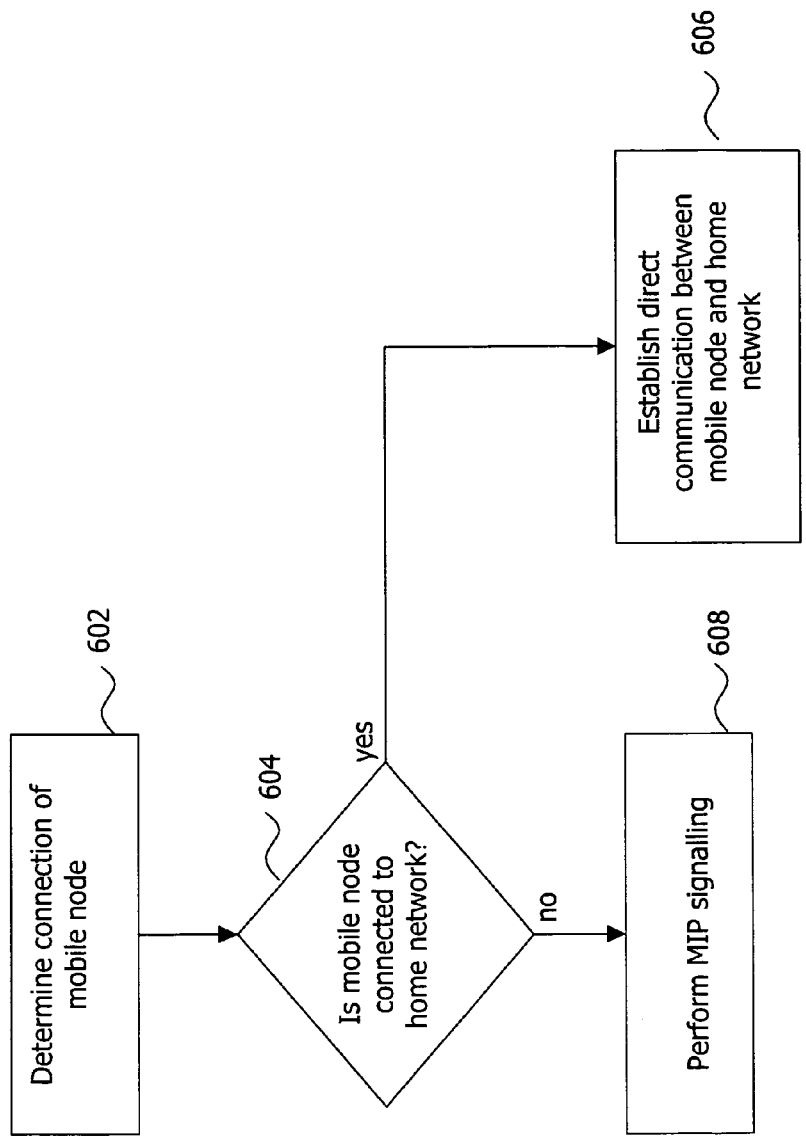
FIG. 6a is a flow diagram schematically illustrating a third method embodiment for establishing communication when the mobile node is connected to the home network and when the mobile node is connected to the foreign network.
Figure 6B:
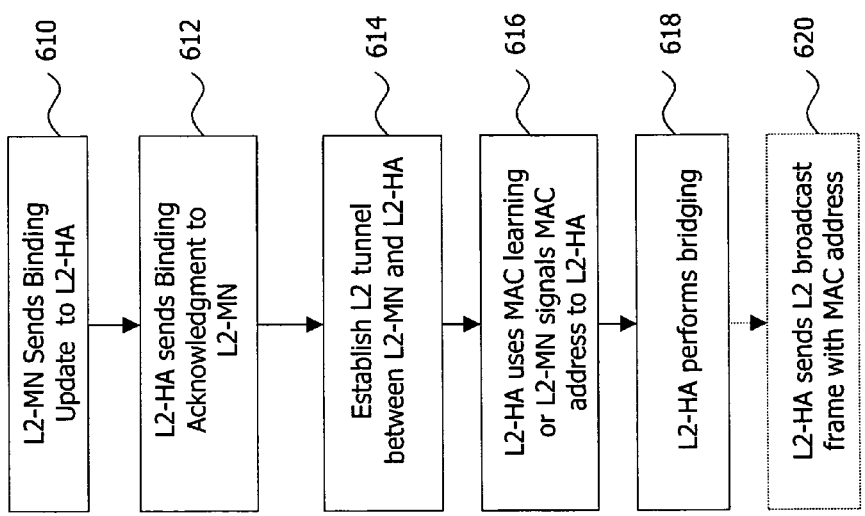

A further alternative network system embodiments is shown in FIG. 5 and is described with respect to FIGS. 6a and 6b.

In the alternative illustrated in FIG. 5, the L2-MN 20 is allowed to perform bridging in the network and hence it may have additional devices connected to it. In FIG. 5, exemplarily one device 30 is connected to the L2-MN 20. However, more than one device 30 may be connected to the L2-MN 20 via the appropriate interfaces.

In this exemplary configuration, the L2-MN 20 has MAC@1 as its L2 address and IP@1 as its IP address. The other device 30 connected to the L2-MN 20 has MAC@2 as its L2 address and IP@2 as its IP address.

As in the alternative illustrated in FIG. 3, it is at first determined in step 602 of FIG. 6a whether the L2-MN 20 is connected to its home network 100 or to the foreign network 120. When it is evaluated in step 604 that the L2-MN 20 is at home, i.e. physically attached to the home network 100, L2-MIP mechanisms are not activated and the L2-MN 20 uses one of its interfaces to connect to the home network 100 in step 606.

When it is determined in step 604 that the L2-MN has moved away from home, i.e. the L2-MN 20 detects that is no longer physically attached to the home network 100 but is now attached to a new (foreign) network 120, a new IP address (CoA) is assigned to the L2-MN by the foreign network. In this case, mobile IP signalling is performed with the L2-HA 10 in step 608. Details of step 608 are set forth with respect to FIG. 6b.

For performing mobile IP signalling, the L2-MN 20 sends a Binding Update (BU) to the L2-HA 10 in step 610 which establishes the tunnelling between the L2-HA 10 and the L2-MN 20. The L2-HA 10 responds with a Binding Acknowledgement (ACK) in step 612.

The tunnel 160 is established in step 614 and acts as a virtual L2 LAN segment, which carries full L2 frames. The tunnel 160 may be formed by using multiple techniques, such as IP-in-IP or IPsec tunnelling. The use of IPsec is advantageous for security reasons. On top of these tunnelling mechanisms, L2TPv3 or EtherIP can be used to carry L2 frames in the underlying IP tunnel 160.

The L2-HA 10 may use MAC learning in step 616 to discover that the L2-MN having MAC@1 as its MAC address is reachable over the L2-MIP tunnel 160. Alternatively, the BU signalling in step 616 may be used to notify the L2-HA 10 that the L2-MN 20 having MAC@1 as its MAC address is now reachable over the new L2 tunnel 160.

As an optimization option, it is possible to include in step 616 the L2 address(es) of the one or more other devices 30 connected to the L2-MN 20 (such as MAC@2 as the MAC address of the device 30) in the BU towards the L2-HA 10. Thereby, the L2-HA 10 can learn the location of the L2-MN (MAC@1) and of the other device (MAC@2) fast and e.g. faster than by pure MAC learning. The L2-MN 20 has information about the L2 addresses of ports reachable from it based on its Spanning tree information. Advantageously, the one or more other devices 30 stay connected to the L2-MN 20 during mobility of the L2-MN 20.

The L2-MN 20 acts as a bridge (following 802.1D terminology) in step 618, to bridge PDUs exchanged between the L2-MN 20 and the L2-HA 10. By connecting even more additional devices to the L2-MN 20 the L2 network can be expanded.

Spanning tree topology update may be advantageous due to the L2-MN 20 movement because L2-MN is a bridge. Using RSTP, it may take a few seconds to converge. This also may cause flushing of filtering states on some ports and hence extra broadcasts.

Optionally, the L2-MN 20 may send a L2 broadcast frame with its L2 address (MAC@1) as the source in order to let other bridges in the subnet learn its new location (and/or flush information about its old location) in step 620. Broadcast may be e.g. a new DHCP request, an ARP packet, a newly defined broadcast frame or other frame. Sending this broadcast frame may make MAC learning faster in other bridges and hence decrease the amount of L2 broadcasts and packet losses. However, step 620 may also be skipped.

Sending such an L2 broadcast frame may be repeated a few seconds later after the RSTP has updated the Spanning Tree.

The L2-MN 20 may also send broadcast frames on behalf of the one or more other devices 30 connected to the L2-MN 20 in step 620 in order to let other bridges in the subnet flush old location information and learn the new location of the one or more other devices 30 if the L2-MN 20 knows that those devices 30 are indeed connected to it. However, there is no need to send the broadcast frames on behalf of the one or more other devices 30 and this step may alternatively be skipped.

In the previous embodiments explained with reference to FIGS. 3 to 6, the L2-MN 20 kept its MAC address as it moved away from its home network 100, meaning that the L2-MN 20 used the same MAC address to send and receive frames over the L2-MIP tunnel 160 as the MAC address of its interface used in the home network 100. This does not cause any problem in the L2 network as the L2-MN 20 only uses the L2-MN tunnel 160 when the L2-MN 20 is away and the same MAC address is not used to directly connect to the same L2 network.

It is believed that many advantages of the present invention will be fully understood from the foregoing description, and it will be apparent that various changes may be made in the form, construction and arrangement of the exemplary aspects thereof without departing from the scope of the invention or without sacrificing all of its advantages. Because the invention can be varied in many ways, it will be recognized that the invention should be limited only by the scope of the following claims.

The invention claimed is:

1. A method for maintaining communication established between a mobile node and a home network of the mobile node, the method comprising:
   determining, by the mobile node, whether the mobile node has moved to a foreign network different from the home network;
   in response to determining the mobile node has moved to the foreign network:
      signalling, by the mobile node, an Internet Protocol Care-of-Address (IP CoA) assigned by the foreign network, to a home agent of the home network;
      maintaining the communication between the mobile node and the home network by establishing, by the home agent of the home network, a Layer2 (L2) tunnel between the mobile node and the home agent of the home network for transmission of Data Link Layer (DLL) frames through an IP based network;
      receiving, by the home agent of the home network, data addressed to a home address of the mobile node; and
      forwarding, by the home agent of the home network, DLL frames to the IP CoA of the mobile node through the IP based network, wherein the DLL frames contain the data addressed to the home address of the mobile node.

2. The method of claim 1, wherein the method further comprises, in response to the determining that the mobile node has moved to the foreign network:
   receiving, by the home agent of the home network, DLL frames transmitted from the mobile node through the IP based network, wherein the mobile node has the IP CoA assigned by the foreign network;
   forwarding, by the home agent of the home network, the DLL frames received by the home agent from the mobile node.

3. The method of claim 1, wherein the determining whether the mobile node has moved to the foreign network comprises:
   determining that the mobile node is connected to the home network;
   determining if a preconfigured identification broadcast of the home network is detected by the mobile node; and
   determining if, in response to receipt of the preconfigured identification broadcast, successful authentication towards the home network is performed by the mobile node.

4. The method of claim 1, wherein the determining whether the mobile node has moved to the foreign network comprises:
   sending, by the mobile node, a solicitation message as a local broadcast frame to the home network; and
   sending, by the home agent in response to receipt of the solicitation message, an advertisement message as a local broadcast frame to the mobile node;
   wherein it is determined that the mobile node is connected to the home network if the advertisement message arrives at the mobile node within a predefined time period.

5. The method of claim 4, further comprising the mobile node, in response to receipt of the advertisement message at the mobile node, sending a broadcast message as a local broadcast frame sent only on the home network, wherein the sent broadcast message contains the home address of the mobile node in the home network.

6. The method of claim 1, wherein the signaling the IP CoA comprises sending, by the mobile node, a binding update to the home agent, which binds the signaled IP CoA with a physical address of the mobile node.

7. The method of claim 6, wherein the physical address comprises a Media Access Control (MAC) address.

8. The method of claim 1, further comprising learning, by the home agent, a physical address of the mobile node.

9. The method of claim 8, wherein the physical address comprises a Media Access Control (MAC) address.

10. The method of claim 1, further comprising signaling, by the mobile node, a further IP CoA of a device connected to the mobile node, to the home agent, wherein the further IP CoA is assigned by the foreign network.

11. The method of claim 10, further comprising forwarding, by the mobile node, DLL frames to the further IP CoA of the device.

12. The method of claim 1, wherein, in response to determining that the mobile node is connected to the home network, the mobile node and the home network directly communicate with each other.

13. The method of claim 1, wherein forwarding the DLL frames comprises tunneling the DLL frames by using one of the following through the IP-based network:
    an L2 Tunneling Protocol (L2TP);
    an L2 Tunneling Protocol version 3 (L2TPv3);
    an EtherIP;
    an IP security (IPsec); and
    a Security Socket Layer (SSL).

14. A computer program product stored in a non-transitory computer readable medium for controlling a home agent of a home network of a mobile node, the computer program product comprising software instructions which, when run on the home agent, causes the home agent to:
    receive, from the mobile node, an Internet Protocol Care-of-Address (IP CoA) assigned by a foreign network different from the home network of the mobile node, when the mobile node has moved to the foreign network;
    receive data addressed to a home address of the mobile node;
    maintain the communication between the mobile node and the home network by establishing a Layer2 (L2) tunnel between the mobile node and the home agent for transmission of Data Link Layer (DLL) frames through an IP based network; and
    in response to determining that the mobile node has moved to the foreign network, forward DLL frames to the IP CoA of the mobile node through the IP based network, wherein the DLL frames contain the data addressed to the home address of the mobile node.

15. A home agent for maintaining communication established between a mobile node and a home network of the mobile node, wherein the home agent comprises:
    a receiving component configured to receive, from the mobile node, an Internet Protocol Care-of-Address (IP CoA) assigned by a foreign network different from the home network of the mobile node, when the mobile node has moved to the foreign network; and
    a tunneling component configured to maintain the communication between the mobile node and the home network by establishing a Layer2 (L2) tunnel between the mobile node and the home agent for transmission of Data Link Layer (DLL) frames through an IP based network;
    wherein the receiving component is further configured to receive data addressed to a home address of the mobile node; and
    wherein the tunneling component is further configured to, in response to determining that the mobile node has moved to the foreign network, forward DLL frames to the IP CoA of the mobile node through the IP based network, wherein the DLL frames contain the data addressed to the home address of the mobile node.

16. A network system for maintaining communication established between a mobile node and a home network of the mobile node, wherein the network system comprises:
    a home agent comprising:
        a receiving component configured to receive, from the mobile node, an Internet Protocol Care-of-Address (IP CoA) assigned by a foreign network different from the home network of the mobile node, when the mobile node has moved to the foreign network; and
        a tunneling component configured to maintain the communication between the mobile node and the home network by establishing a Layer2 (L2) tunnel between the mobile node and the home agent for transmission of Data Link Layer (DLL) frames through an IP based network;
        wherein the receiving component is further configured to receive data addressed to a home address of the mobile node; and
        wherein the tunneling component is further configured to, in response to determining that the mobile node has moved to the foreign network, forward DLL frames to the IP CoA of the mobile node through the IP based network, wherein the DLL frames contain the data addressed to the home address of the mobile node; and
    the mobile node;
    wherein the network system is configured to determine whether the mobile node has moved to the foreign network, and, in response to determining that the mobile node has moved to the foreign network, the network system is configured to maintain the communication between the mobile node and the home network by establishing communication between the mobile node and the home agent of the home network for transmission of DLL frames through an Internet Protocol (IP) based network, wherein the mobile node is addressed by the IP CoA assigned by the foreign network.

17. The network system of claim 16, wherein the home agent is configured to:
    receive data addressed to a home address of the mobile node; and
    in response to determining that the mobile node has moved to the foreign network, forward the DLL frames to the IP CoA of the mobile node through the IP based network, wherein the forwarded DLL frames contain the data addressed to the home address of the mobile node.

18. The network system of claim 16, wherein, in response to determining that the mobile node is connected to the foreign network, the home agent is configured to:
    receive the DLL frames transmitted from the mobile node through the IP based network, wherein the mobile node has the IP CoA assigned by the foreign network; and
    forward the DLL frames received by the home agent from the mobile node.

* * * * *

UNITED STATES PATENT AND TRADEMARK OFFICE
CERTIFICATE OF CORRECTION

PATENT NO.         : 9,173,153 B2                                              Page 1 of 1
APPLICATION NO.    : 13/816594
DATED              : October 27, 2015
INVENTOR(S)        : Miklos et al.

It is certified that error appears in the above-identified patent and that said Letters Patent is hereby corrected as shown below:

IN THE SPECIFICATION

In Column 8, Line 2, delete "1.2" and insert -- L2 --, therefor.

Signed and Sealed this
First Day of March, 2016

Michelle K. Lee
*Director of the United States Patent and Trademark Office*